United States Patent [19]

Sefcik

[11] Patent Number: 5,707,312
[45] Date of Patent: Jan. 13, 1998

[54] MULTI-SPEED POWER TRANSMISSION

[75] Inventor: Michael Colby Sefcik, Brighton, Mich.

[73] Assignee: General Motors Corporation, Detroit, Mich.

[21] Appl. No.: 639,238

[22] Filed: Apr. 19, 1996

[51] Int. Cl.$^6$ .................................................. F16H 3/62
[52] U.S. Cl. ........................ 475/275; 475/285; 475/284
[58] Field of Search .................................. 475/275, 284, 475/285

[56] References Cited

U.S. PATENT DOCUMENTS

| 5,069,656 | 12/1991 | Sherman | 475/284 X |
| 5,129,870 | 7/1992 | Pierce | 475/285 |
| 5,435,792 | 7/1995 | Justice et al. | 475/275 X |
| 5,536,220 | 7/1996 | Martin | 475/275 |
| 5,542,889 | 8/1996 | Pierce et al. | 475/275 |
| 5,567,201 | 10/1996 | Ross | 475/284 X |
| 5,599,251 | 2/1997 | Beim et al. | 475/275 |
| 5,605,517 | 2/1997 | Sherman | 475/284 X |

OTHER PUBLICATIONS

U.S. Serial No. 08/561,345, filed Nov. 21, 1995, in the name of James F. Sherman and assigned to the assignee of the present invention.

*Primary Examiner*—Khoi Q. Ta
*Assistant Examiner*—Peter T. Kwon
*Attorney, Agent, or Firm*—Doanld F. Scherer

[57] ABSTRACT

A power transmission having two simple planetary gear sets produces five forward speed ratios and a reverse ratio. The two highest forward speed ratios, fourth and fifth, are overdrive ratios using the same input member in one of the planetary sets and exchanging output members in the other planetary set. The power transmission also has a continuous input drive to a sun gear of one of the planetary sets and incorporates five clutches and two brakes to establish the five forward speed ratios. The clutches and brakes are disposed in parallel with the clutch and one-way device to permit more control of the shift timing. The continuous input to the sun gear is employed in all the forward ratios and in the reverse ratio.

2 Claims, 2 Drawing Sheets 5,707,312

MULTI-SPEED POWER TRANSMISSION

TECHNICAL FIELD

This invention relates to multi-speed power transmissions and more particularly to power transmissions having two planetary gear sets and five forward speed ratios.

BACKGROUND OF THE INVENTION

Automatic shifting multi-speed power transmissions, especially three and four speed versions, have been used in passenger vehicles for some time. These transmissions have generally used two simple planetary gear sets or a single compound planetary gear set, such as those proposed by Ravigneaux. There have been five speed transmissions utilizing Ravigneaux speeds proposed for automotive transmissions also.

As a general rule, these arrangement produce two underdrive ratios, a direct drive ratio and an overdrive ratio. The five speed Ravigneaux set will produce two or three underdrive ratios, a direct ratio and two or one overdrive ratios depending upon the gear sizes selected and ratio steps desired.

Many of the three speed arrangements have been extended to four speed versions by adding a simple planetary, generally at the input, to provide an overdrive input ratio to the three speed transmission.

A desire for transmissions with five speeds has emerged, many of these transmissions are proposed with either three simple planetary gear sets or, as mentioned above, a Ravigneaux gear set which is compounded. The compounded Ravigneaux gear set includes two sun gears, two ring gears, the compound long/short pinion carrier assembly interconnecting each of the sun and ring gears. These Ravigneaux arrangements generally three concentric coaxial shaft/gear combinations which result in increased barrel diameter for the transmission case. In transverse front drive vehicles, the case size is not as critical as for longitudinal rear wheel drive vehicles.

SUMMARY OF THE INVENTION

The present invention provides a power transmission arrangement with five forward speeds and a reverse speed using two simple planetary gear sets. The five forward speeds provided are two underdrives, a direct drive and two overdrives. The fourth and fifth forward ratios are both overdrives, use the same power path from the transmission input member, and swap the connection from the gearing output to the final drive mechanism of the transmission. The fourth ratio uses one gear set to establish an overdrive ratio and the fifth ratio uses both gear sets to establish a higher overdrive ratio. The reverse ratio uses the same input as the first and second ratios and reaction as second and fourth ratios as well as the same reaction for a coast braking low ratio.

It is therefore an object of this invention to provide an improved power transmission having two simple planetary gear sets producing five forward speed ratios and a reverse ratio.

DESCRIPTION OF AN EXEMPLARY EMBODIMENT

Figure 1:
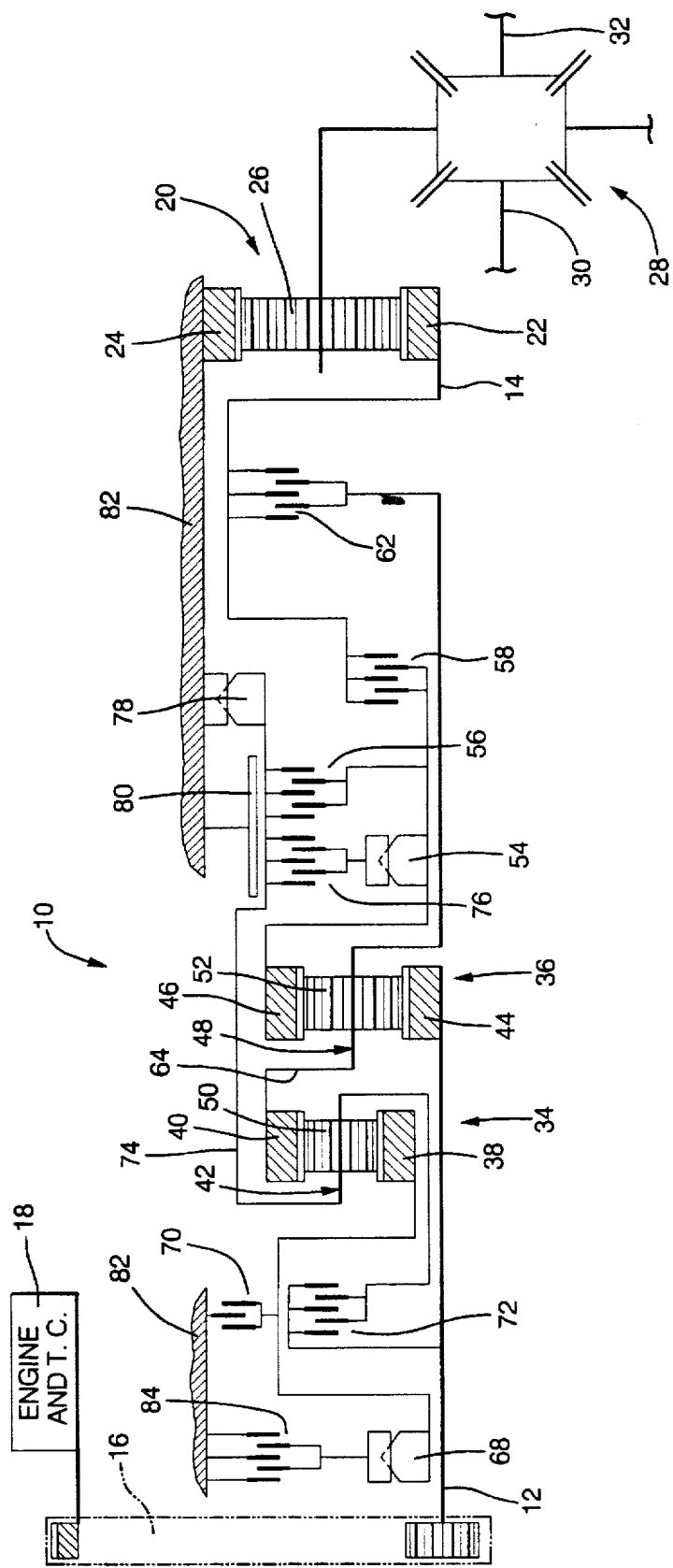
FIG. 1 is a schematic representation of a transmission incorporating the present invention.

There is depicted in FIG. 1 a power transmission generally designated 10 which provides five forward speed ratios between an input shaft 12 and an output shaft 14. The input shaft 12 is connected through a conventional chain drive mechanism 16 to a conventional engine and torque converter assembly 18.

The output shaft 14 is drivingly connected to a final drive gear unit designated 20 which includes a sun gear 22, a ring gear 24 and a carrier assembly 26. The carrier assembly 26 is drivingly connected with a differential assembly 28 which provides output drive to a pair of output shafts 30 and 32. This transmission arrangement 10 will therefore provide a transverse front wheel drive power transmission.

The transmission 10 includes a pair of simple planetary gear sets 34 and 36. The planetary gear set 34 has a sun gear 38, a ring gear 40 and a planetary carrier assembly 42. The planetary gear set 36 has a sun gear 44, a ring gear 46 and a planetary carrier assembly 48.

As is well known, the planetary carrier assemblies 42 and 48 are comprised of a carrier structure in which is rotatably mounted a plurality of pinion gears 50 and 52, respectively. The pinion gears 50 mesh with the sun gear 38 and ring gear 40 while the pinions 52 mesh with the sun gear 44 and ring gear 46. The use of a direct connection by a pinion between the sun and ring qualifies or defines the planetary gear sets 34 and 36 as simple planetary gear sets.

The sun gear 44 is connected directly with the input shaft 12 for continuous rotation whenever the engine and torque converter are driving the chain mechanism 16. The ring gear 46 is connected to a one-way clutch assembly or mechanism 54, a positive clutch assembly 56, and a second positive clutch assembly 58. The clutch assemblies 56 and 58, as are the other clutch and brake assemblies to be discussed in this application, are fluid operated friction devices which are well known in the art.

The carrier assembly 48 of the planetary gear set 36 is drivingly connected with a fluid operated positive engagement clutch assembly 62. The carrier assembly 48 is also connected through a hub 64 with the ring gear 40 of the planetary gear set 34.

The sun gear 38 of the planetary gear set 34 is drivingly connected with a one-way device 68 and a disc brake assembly 70. The carrier assembly 42 of the planetary gear set 34 is operatively connected with a positively engaging clutch assembly 72 and through a hub assembly 74 operatively connected with a clutch assembly 76, the clutch assembly 56, a one-way brake member or assembly 78, and a positively engaging drum brake or band brake 80. The clutch 76 is connected with the one-way assembly 54. Thus, when the clutch 76 is engaged, the carrier assembly 42 and the ring gear 46 are connected for common rotation in one direction whenever the carrier assembly 42 tends to rotate slower than the ring gear 46. However, the ring gear 46 will be permitted to rotate forward faster than the carrier assembly 42 if that event is necessary.

The one-way device 68 is operatively connected to a transmission housing 82 by a positive engaging disc brake 84. The brake assembly 70 is also operatively connected with the housing 82 as is the brake band 80, the one-way device 78 and the ring gear 24 of the planetary gear drive 20.

As previously mentioned, the positively engaging friction devices which include clutches 72, 76, 56, 58 and 62, and the brakes 84, 70 and 80, are conventional fluid operated friction devices. Except for the band brake 80, the units are multi-plate friction devices which are generally axially disposed relative to the shafts within the transmission. The friction device 80 is a band type engaging device which encircle a drum or hub and may be either of the single wrap or double wrap variety, both of which are well known in the art. In the alternative, the brake 80 can be a disc type brake. The engagement and disengagement of these devices is generally controlled by conventional hydraulic or electro-hydraulic systems which might utilize an electronic data processor or other small computer to establish the controlled interchange to provide the various speed ratios within the transmission in a well known manner.

Figure 2:
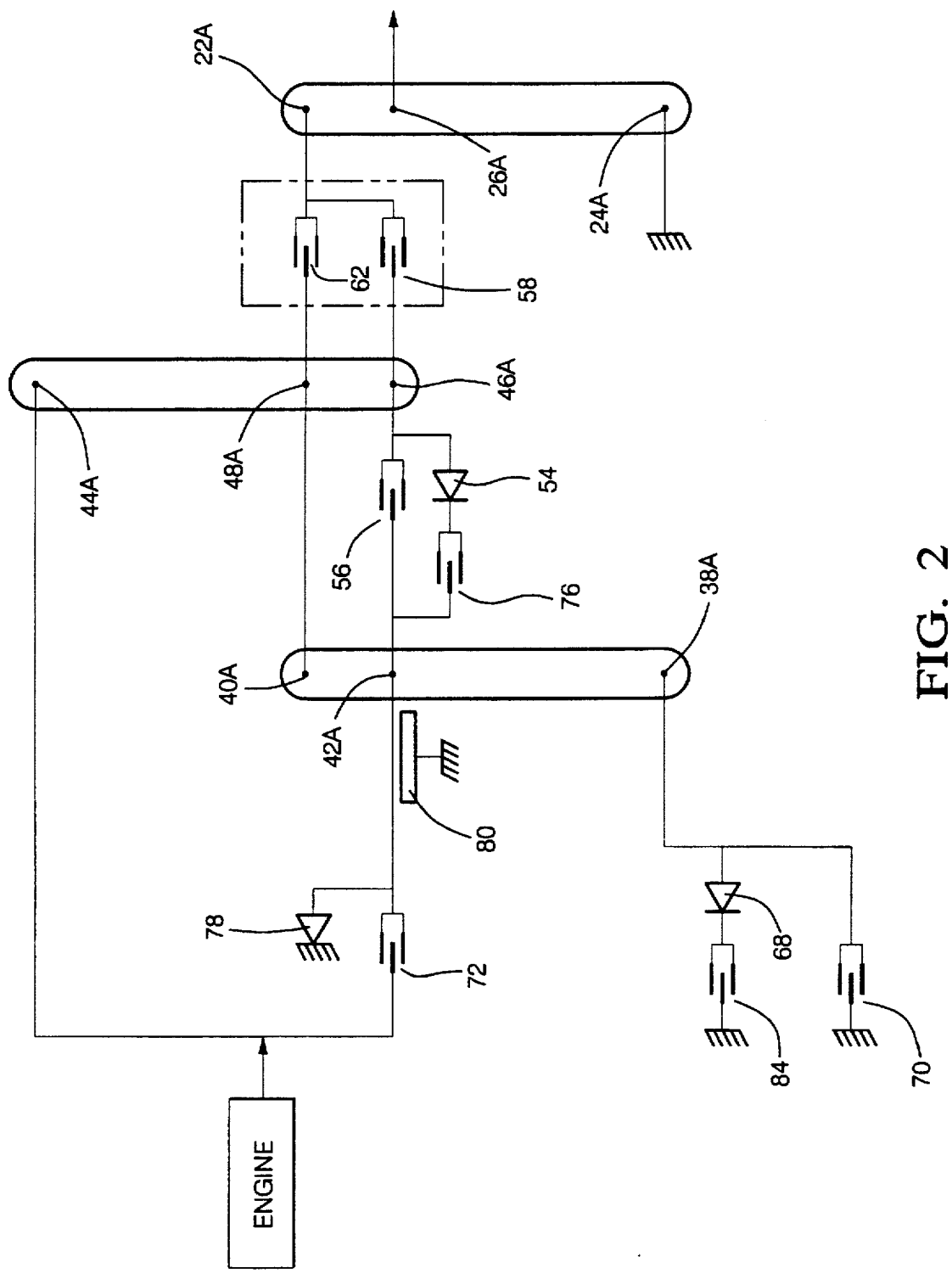
FIG. 2 is a lever diagram of the gearing arrangement shown in FIG. 1.

FIG. 2 is a lever diagram of the gearing arrangement disposed in FIG. 1. The node points of the lever diagram represent the respective sun, ring and carrier assemblies of the planetary gear sets. These nodes have been given the same numerical designation as their respective gear counterpart with an "A" suffix. For example, sun gear 38 is depicted in the lever diagram of FIG. 2 as 38A. The lever diagrams are quite often better visually of the direction and magnitude of drive ratios or speed ratios which are attained by the gear sets.

To establish the forward gear ratios, the clutch 76 is engaged and is thus termed the forward clutch, as will become apparent later. This clutch is overrun at the one-way 54 during the fourth and fifth forward gear ratio. However the clutch 76 will remain engaged. To establish the first and lowest gear ratio, the clutch 76 and one-way device 78 are active. With these devices, if the input drive via shaft 12 to the sun gear 44 results in the ring gear 46 being grounded by the one-way device through clutch 76 and one-way device 78 such that the carrier drives the output shaft 14 through the clutch 62. To provide a positive drive in the first or lowest ratio, in other words, a drive which permits engine coast braking, the clutch 56 and brake band 80 can be engaged, as well as the clutch 62. These clutches, however, while they provide a positive coast braking situation, are not required for forward drive.

To establish the second drive ratio, the brake 84 is engaged thereby providing for retardation and reaction at the sun gear 38 which will result in the output shaft 14 being rotated at a more rapid value relative to the input shaft than was available in the first gear. In second gear, the one-way device 78 will permit overrunning of the carrier assembly 42. As should be apparent from the lever diagram in FIG. 2, in the second forward ratio, the node 44A has an input drive imposed thereon, while the node 38A is held stationary. Therefore, the lever provides a positive forward vector at the output nodes 40A and 48A. This output vector will be greater than the output vector in the low range as the lever ratio has changed. If engine coast braking is desired in the second ratio, the brake 70 can be engaged.

To establish the third forward drive ratio, the clutch 72 is engaged. This will cooperate with the clutch 76 and one-way device 54 to place the gear set in a direct drive situation. In third gear, the brake 84 may remain engaged and the one-way device 68 will permit overruning by the sun gear 38. Again, as can be seen with the lever diagram, the nodes 42A and 44A both have a common input signal and the one-way 68 permits overrunning of the node 38A such that the entire lever diagram has a unitary output.

To establish the fourth forward ratio, the brake assembly 70 is engaged. This retards the rotation of the sun gear 38 and, in referring to FIG. 2, causes the node 38A to be a reaction point. With the node 38A, sun gear 38, being reaction, and the carrier assembly 42, node 42A, being driven at input speed, the ring gear 40, node 40A, will rotate at a value greater than the value of the input speed thereby imposing an overdrive ratio on the node 48A which is connected via the clutch 62 to the node 22A. Thus, an overdrive ratio is attained in fourth gear.

To establish the fifth forward ratio, the clutch 58 is engaged while the other devices remain in their previous active or inactive state. It should be noted that clutch 62 must be disengaged. The engagement of clutch 58 results in the following. The input drive to carrier assembly 42, node point 42A, will result in an overdrive value at carrier assembly 48, node 48A. However, the input drive at sun gear 44, node 44A, will combine with the overdrive speed at node 48A resulting in an increased overdrive speed ratio at node 46A which represents ring gear 46. Thus, in fifth gear, the following devices can be active—clutch 72, brake 84, clutch 76 and clutch 58. The clutch 56, the forward coast clutch, and the clutch 62 are disengaged as is the low reverse band assembly 80. The overrunning or one-way devices 78 and 54 will be in an overrunning condition.

To establish the reverse drive ratio, the clutch 58 is engaged as is the brake 70 and the brake 80. From the lever diagram, it will become obvious that the planetary gear set 34 is stationary since both the carrier assembly 42, node 42A, and the sun gear 38, node 38A, are connected to the housing 82. Thus, the carrier assembly 48, node 48A, is stationary. The power at node 44A is reversed and delivered to the node 46A and via the clutch 58 to the final drive 20. Thus, a reverse drive is provided. It should be noted that the reverse drive does not utilize one-way device or an input clutch and therefore the reverse ratio is a positive drive both during engine power and engine coast.

From the foregoing, it should be apparent that the two simple planetary gear sets 34 and 36 can be controlled to provide five forward speed ratios and one reverse ratio. Some of the important factors to note are that the sun gear 44 is continually driven by the input during all phases of transmission operation and the fourth to fifth ratio interchange requires only the engagement of clutch 58 and release of the clutch 62 on an upshift and the disengagement of clutch 58 and apply of clutch 62 on a downshift.

It should be further appreciated that all forward speed ratios can be conditioned to provide a positive coast braking during throttle release by the operator should that condition be desired. The final drive assembly 20 reduces the speed of output shaft 14 while multiplying the torque transmitted. Thus, the speed range of the vehicle even with two forward overdrive ratios can be controlled well within the desired operating ranges of such passenger vehicles

I claim:

1. A power transmission comprising:
   an input member;
   an output member;
   a first planetary gear set having a first sun gear, a first ring gear and a first planet carrier assembly including a plurality of rotatably mounted pinion gears each meshing with both the first sun gear and the first ring gear;
   a second planetary gear set having a second sun gear, a second ring gear and a second carrier assembly including a plurality of rotatably mounted pinion gears each meshing with both the second sun gear and the second ring gear;
   said first sun gear being continuously connected with said input member, said first carrier assembly and said second ring gear being connected for common rotation;

a first brake means selectively connectible between the second carrier assembly and a stationary member for selectively preventing rotation of the second carrier;

a first clutch means selectively connectible between the second carrier assembly and the first ring gear for effecting common rotation therebetween;

a second brake means including a positive grounding brake for selectively connecting said second sun gear with said stationary member;

a second clutch means for selectively connecting said second carrier assembly with said input member;

third clutch means for selectively connecting said first carrier assembly and said output member; and fourth clutch means for selectively connecting said first ring gear to said output member, said clutch means and said brake means being selectively engaged to establish five forward ratios and one reverse ratio between said input member and said output member, said first brake means, the positive grounding brake and the fourth clutch means being engaged to establish the reverse ratio.

2. The power transmission defined in claim 1 wherein the first sun gear transmits input power to the first planetary gear set in all five forward ratios and the reverse ratio.

* * * * *